Dec. 12, 1950   B. LIPNICKI ET AL   2,533,947
ELECTRIC SPOON
Filed Jan. 21, 1949
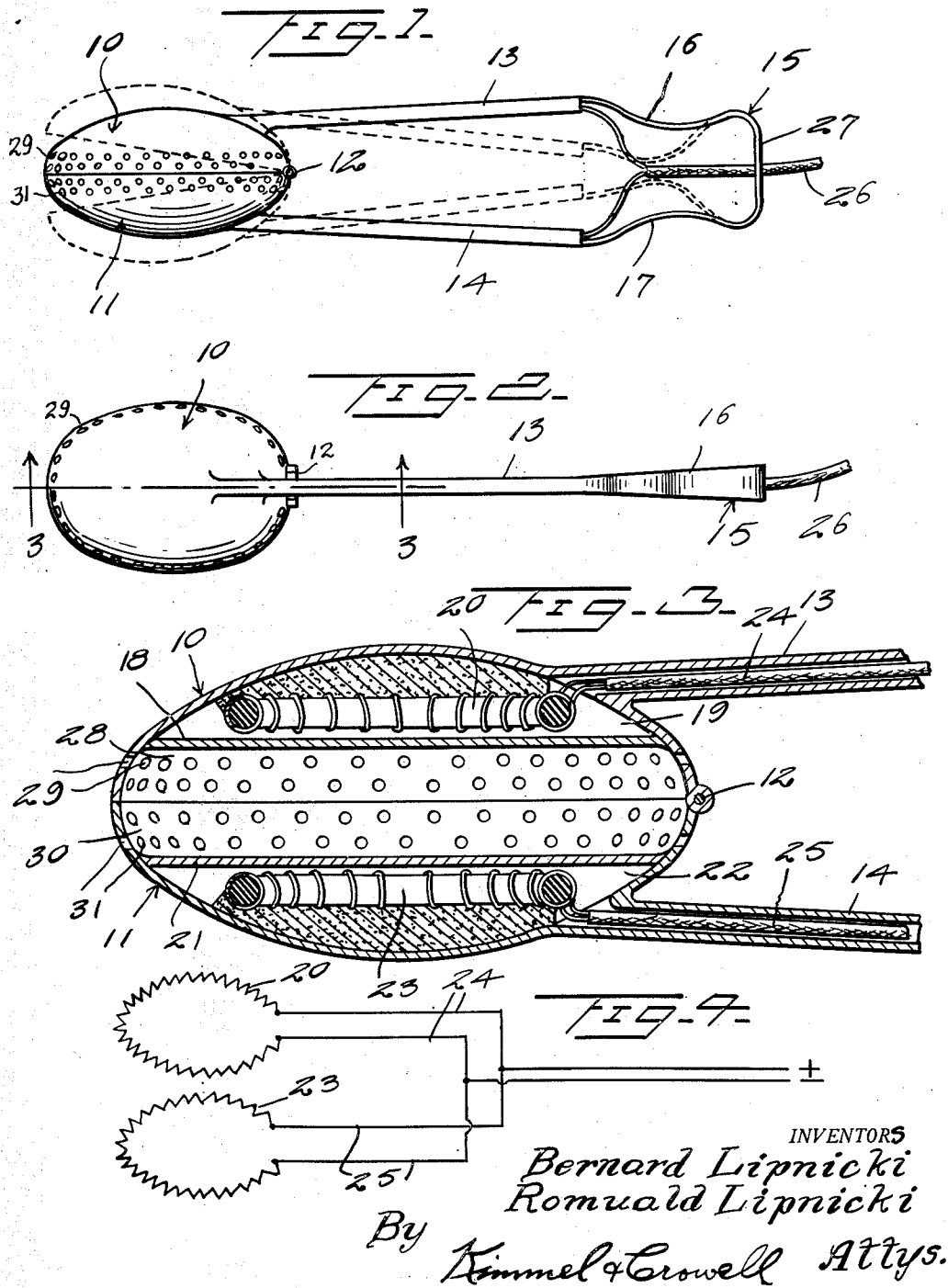
INVENTORS
Bernard Lipnicki
Romuald Lipnicki
By Kimmel & Crowell Attys.

Patented Dec. 12, 1950

2,533,947

UNITED STATES PATENT OFFICE 2,533,947

ELECTRIC SPOON

Bernard Lipnicki and Romuald Lipnicki,
Newington, Conn.

Application January 21, 1949, Serial No. 72,026

3 Claims. (Cl. 219—41)

This invention relates to electric heaters.

An object of this invention is to provide a device for heating liquids in a small receptacle for making small amounts of coffee, tea, hot water or the like, the device being constructed in the form of a pair of complementary spoon-shaped members hinged together and provided with a pair of spring-pressed handles which normally hold the members together.

Another object of this invention is to provide a combined heater and receptacle adapted to be immersed in a cup, tumbler, pan or the like, which includes means for holding coffee, tea or the like in a perforate portion of the device, so that the liquids may circulate through the receptacle and the material contained in the receptacle will be confined in a manner so that the desired beverage will be generated.

A further object of this invention is to provide a device of this kind which is of simple construction and which has the heater elements thoroughly sealed so that they will not be damaged when the device is immersed in water.

A further object of this invention is to provide a pair of spoon-shaped members which are disposed in confronting position, being hinged together at the rear of the bowls and having handles fixed thereto and connected together at their rear ends by means of a spring which will normally swing the handles to closed position.

With the above and other objects in view, our invention consists in the arrangement, combination and details of construction disclosed in the drawing and specification, and then more particularly pointed out in the appended claims.

In the drawing,

Figure 1 is a detail side elevation of an electric spoon constructed according to an embodiment of our invention, Figure 2 is a top plan view of the device, Figure 3 is a fragmentary sectional view taken on the line 3—3 of Figure 2, Figure 4 is a diagrammatic view showing the electric circuits embodied in this invention.

Referring to the drawing, the numerals 10 and 11 designate generally a pair of confronting oval-shaped receptacle forming members which are hinged together by hinge means 12 adjacent the rear thereof. These bowl forming members 10 and 11 are adapted to be normally disposed in contacting relation as will be hereinafter described so as to provide a closed receptacle.

The bowl member 10 has fixed thereto a tubular handle 13 which extends rearwardly therefrom at a point outwardly from the hinge 12 and the bowl member 11 also has fixed thereto a rearwardly extending tubular handle 14. The rear ends of the handles 13 and 14 are connected together by a substantially U-shaped spring 15, which has the opposite legs 16 and 17 longitudinally bowed as shown in Figure 1. The bowl member 10 has fixed on the interior thereof a wall or plate 18 forming a heating chamber 19 within which an electric heating element 20 is adapted to be positioned. The bowl member 11 also has fixed on the inside thereof a wall 21 which forms a heating chamber 22 in the bowl member 11, and an electric heating element 23 is positioned within the chamber 22.

Conductors 24 and 25 are connected at their forward ends to the heating elements 20 and 23 and extend through the tubular handles 13 and 14 and are connected to a common conductor 26 which extends through the bight 27 of the spring 15. The wall 18 also forms within the bowl member 10 an inner chamber 28 and the bowl member 10 is provided with a plurality of holes 29 so that liquids which are to be heated may freely enter the chamber 28. The wall 21 forms in the bowl member 11 a chamber 30, and the bowl member 11 is also formed with a plurality of holes 31 so that the liquid in the cup, or other receptacle may freely enter the chamber 30.

In the use and operation of this device, when it is merely desired to heat water in a small receptacle or the like, the two bowl members 10 and 11 are left in contacting position and the bowl members immersed in the water or other liquid. The conductor 26 is then connected to a source of electric current supply. The heating elements 20 and 23 will heat the liquid in the receptacle, the liquid freely flowing through the holes 29 and 31 in the bowl members 10 and 11. When it is desired to make coffee or tea in a cup or other small receptacle, the coffee or tea is placed within the bowl members 10 and 11. This is accomplished by simply rocking the handles 13 and 14 toward each other against the tension of the spring 15 so that the bowl members 10 and 11 will swing open to substantially the dotted line position shown in Figure 1. The bowl members may be pressed into the loose coffee or tea, and the handles 13 and 14 may then be released and the contacting bowl members then placed within the cup or other receptacle. This device will provide a means whereby coffee or tea may be quickly made in a small quantity such as in a cup or the like, and the coffee grounds or tea leaves held within the perforate chambers formed in the two bowl members.

We do not mean to confine ourselves to the exact details of construction herein disclosed, but claim all variations falling within the purview of the appended claims.

What we claim is:

1. An immersion heater comprising a pair of confronting spoon-shaped members, means hingedly securing said members together one end thereof, a pair of elongated tubular handles fixed to and extending rearwardly from said one end of said members, a wall fixed in each of said members extending parallel to the edge thereof and dividing the interior thereof into a pair of chambers, a heating element in the inner one of said chambers, the outer wall of said other chamber being formed with openings, electrical conductors extending through said handles and connected to said heating elements, and a spring fixed between the rear ends of said handles normally holding said members in confronting and contacting position.

2. An immersion heater comprising a pair of oppositely disposed spoon-shaped members, means hingedly securing said members together at the rear ends thereof, a pair of elongated tubular handles fixed to and extending rearwardly from said members, a wall fixed in each of said members dividing the interior thereof into a sealed inner chamber and an outwardly opening chamber, a heating element in said sealed chamber, the outer wall of said other chamber being formed with openings, electrical conductors extending through said handles and connected to said heating elements, and a spring fixed between the rear ends of said handles normally holding said members in confronting and contacting position, said spring being of U-shape with the legs thereof longitudinally bowed.

3. An immersion heater comprising a pair of oppositely disposed spoon-shaped members, elongated tubular handles fixed to and extending rearwardly from said members, a spring fixed between said handles at the rear of the latter constantly urging said handles apart at the rear thereof and constantly urging said members toward each other, a longitudinally extending wall in each member forming a sealed inner chamber and an outwardly opening chamber, an electric heating element in the sealed chamber of each member, and conductors connected to said members and extending through said handles, each of said members having openings in the wall thereof communicating with the outwardly opening chamber thereof, said members when in confronting and contacting relation forming a closed perforate beverage brewing chamber in close proximity to said heating elements.

BERNARD LIPNICKI.
ROMUALD LIPNICKI.

REFERENCES CITED

The following references are of record in the file of this patent:

UNITED STATES PATENTS

| Number | Name | Date |
|---|---|---|
| 1,947,582 | Re David | Feb. 20, 1934 |
| 2,135,313 | Nolte | Nov. 1, 1938 |

FOREIGN PATENTS

| Number | Country | Date |
|---|---|---|
| 24,055 | Great Britain | Nov. 26, 1901 |
| 349,279 | Germany | Dec. 24, 1920 |